No. 625,437. Patented May 23, 1899.
G. DONAT.
VALVE.
(Application filed Feb. 15, 1899.)
(No Model.)
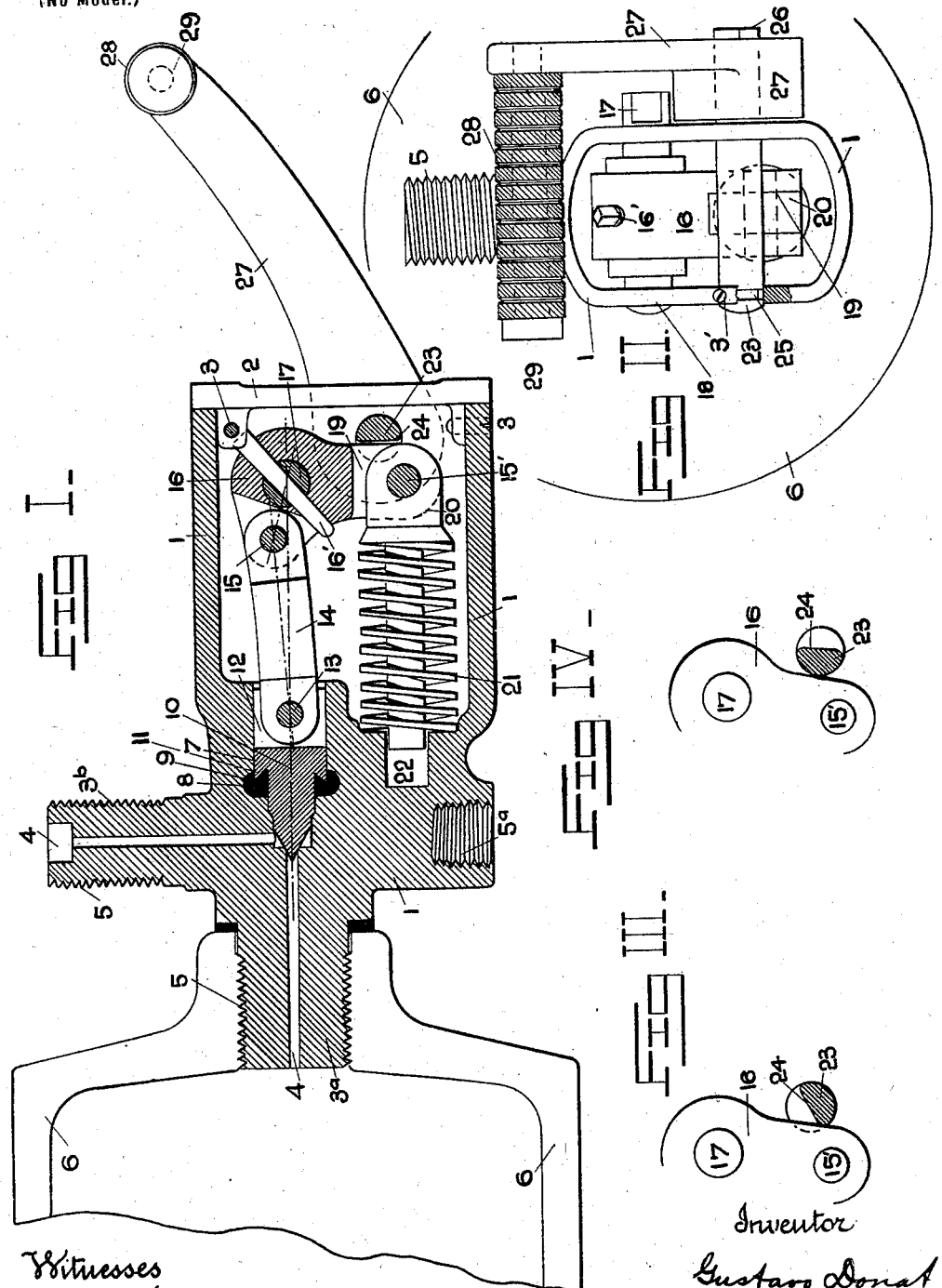
Witnesses
George M Richards,
John Enders Jr
Inventor
Gustavo Donat
per
Wm H Babcock
Attorney.

UNITED STATES PATENT OFFICE.

GUSTAVO DONAT, OF LONDON, ENGLAND.

VALVE.

SPECIFICATION forming part of Letters Patent No. 625,437, dated May 23, 1899.

Application filed February 15, 1899. Serial No. 705,524. (No model.)

*To all whom it may concern:*

Be it known that I, GUSTAVO DONAT, warehouseman, residing at 3 and 4 Australian avenue, in the city of London, England, have invented an Improved Valve Applicable to Vessels Containing Compressed Gas, Gases, or Gaseous Liquids; and I do hereby declare the following to be a full, clear, and exact description of the invention, such as will enable others skilled in the art to which it appertains to make and use the same.

My invention relates to improved valves and their actuating mechanism applicable to vessels containing compressed gas, mixed gases, gaseous liquids, and the like, the object I have more particularly in view being such simplification and adjustment of the interacting parts as that while the wear and tear are reduced to a minimum the effort required to open the valve, even against very high pressure, is diminished, and since the valve-spindle is practically relieved of all lateral stress the face of the valve is always in alinement or true with its seat, which cannot wear unequally, leakage being thereby avoided.

The said invention consists in the construction and combination of parts hereinafter particularly set forth and claimed.

The construction and operation of my invention will be readily understood by reference to the drawings, in which—

Figure 1 is a sectional view of the valve. Fig. 2 is an end view showing foot-lever. Fig. 3 shows the relative position of cam and driving-spindle when in ordinary use. Fig. 4 shows the position of same when charging.

In the drawings, 1 is the frame or body. This may be conveniently cast in gun-metal, brass, or any like suitable metal, the interior being cored out conveniently for tooling and fitted with a cover 2, secured by set or grub screws 3. The neck $3^a$ at the reverse end of the body is drilled, as at 4, with a small hole and screwed externally, as at 5, so as to fit the corresponding recess in the gas-bottle or the like 6. This hole is widened out, as at 7, part being recessed or shaped, as at 8, for the reception of the rubber packing-ring 9, which is passed in endwise, its resiliency enabling it to adapt itself to the recessed seat 8. The boss $3^b$ is drilled, as at 4, and screwed externally, as at 5, to fit the union or other device by which connection is made to the gas-bag or equivalent. The lower part of the body may also conveniently be drilled and tapped, as at $5^a$, and thereby fastened to any suitable frame or support. The valve 10 I prefer to form of German silver; but it may be made of any other suitable metal. It is carefully turned to the shape shown and fitted to the hole 7. The shoulder 11 is slightly undercut, so as to firmly grip and force the packing-ring 9 against its seat. The outer end of the valve-spindle, which acts as a guide, is slotted, as at 12, drilled, and secured by a pin 13 to the link 14, which is pivoted at 15 to the cam 16. This cam is keyed by a pin 16' to a stout arbor or spindle 17, journaled, as shown at 18, in the side walls of the body. The lower end or tail of the cam is forked, as at 19, and secured by a pin 15' to a metallic plunger 20, encircled by a stout spring 21, the tail of the plunger being stepped into the guiding-hole 22. A rocking spindle 33, formed with a flat side 24, abuts against the fork of the cam and is journaled in the side wall of the body, as shown in Fig. 2, and prevented from shifting laterally by the set-screw 3', which engages with a groove 25, formed therein. On the end of this spindle is formed a square 26, and to this is fitted a lever 27, which may take any desired shape. When, however, the valve is mounted upon a bottle containing gas, such as nitrous oxid or its equivalent employed as an anesthetic, I prefer to use the bent form of lever shown. This is then fitted with a roller 28, turning upon the pin 29, screwed into the end of lever 27. By placing the foot upon the roller the operator can more easily control the supply of gas.

The operation of my invention is as follows: It will be observed that the side of the spindle next the tail or lower end of the cam is cut away, so as to have a nearly flat face, the edges being rounded. When the foot-lever 27 or its equivalent, mounted upon the spindle 23, is depressed, the tail of the cam is forced inward against the pressure of the spring, the spindle assuming the position shown in Fig. 3. The effect of this, through the link 14, is to pull the valve off its seat and permit the gas, gases, or gaseous liquids to pass into the bag or equivalent replacing it. Owing, however, to the particular position of the pin 15 with regard to the spindle 17, on which the cam is mounted, the direction of motion of the link 14 (see dotted lines, Fig. 1) approximates very closely to a straight line, thus preventing all lateral strain upon the combined valve and spindle 10 and insuring axial alinement with its seat.

When charging the cylinder, the spindle 23 is rotated so as to cause its rounded face to abut against the tail of the link (see Fig. 4) and hold the valve open.

What I claim as my invention, and desire to secure by Letters Patent, is—

1. In combination with a passage for fluid and a valve controlling the same, a spring and intermediate connections including a pivoted cam operating to close the said valve, a rocking spindle having a flattened side and a rounded side, the latter being arranged to bear on an arm of the said cam, for holding open the said valve, and a foot-lever mounted on the said spindle, for turning the same, substantially as set forth.

2. In apparatus for regulating the charging or discharging of compressed gas, gases, gaseous liquids or the like, the link 14 pivoted to the rigidly-guided valve 10 and to the rocking cam 16 mounted on the arbor 17 in the side walls the guided spindle 20 pivoted to the tail of said cam and encircled by the spring 21 for keeping said valve upon its seat and the driving-spindle 23, shaped as shown for actuating said cam by the means and in the manner set forth.

In testimony whereof I hereunto affix my signature in presence of two witnesses.

GUSTAVO DONAT.

Witnesses:
 FRANCIS HERON ROGERS,
 F. WILLIAM WORLEDGE.